United States Patent [19]
Cole

[11] Patent Number: 4,848,909
[45] Date of Patent: Jul. 18, 1989

[54] ION BEAM SPUTTERED MIRRORS FOR RING LASER GYROS

[75] Inventor: Barrett E. Cole, Bloomington, Minn.

[73] Assignee: Honeywell Inc., Minneapolis, Minn.

[21] Appl. No.: 125,513

[22] Filed: Nov. 25, 1987

Related U.S. Application Data

[63] Continuation of Ser. No. 824,981, Jan. 31, 1986, abandoned.

[51] Int. Cl.$^4$ ............................................. G01C 19/64
[52] U.S. Cl. ..................................... 356/350; 372/94
[58] Field of Search .................. 356/350; 372/107, 94

[56] References Cited

U.S. PATENT DOCUMENTS

| | | |
|---|---|---|
| 3,904,986 | 9/1975 | Hernquist . |
| 4,063,803 | 12/1977 | Wright et al. . |
| 4,142,958 | 3/1979 | Wei et al. ........................ 204/192 P |
| 4,203,080 | 5/1980 | Wright et al. ....................... 372/107 |
| 4,233,568 | 11/1980 | Hamerdinger et al. ............. 372/107 |
| 4,271,397 | 6/1981 | Stiles et al. .......................... 356/350 |
| 4,525,028 | 6/1985 | Dorschner ........................... 356/350 |
| 4,672,623 | 6/1987 | Mellum et al. ...................... 356/350 |

OTHER PUBLICATIONS

"Toshiba Glass-Sealed He-Ne Laser Tubes", by T. Shimada et al. Toshiba Review, No. 105, Sep.-Oct. 1976.
"Molecular Bonding in Optical Films Deposited by Ion-Beam Sputtering", by C. Y. She.
"Alumina/Silica Multilayer Coatings for Excimer Lasers", by S. R. Foltyn et al.
"Recent Developments in Reactively Sputtered Optical Thin Films", by W. T. Pawlewicz et al.
"Thermal Stability Studies of Sputter-Deposited Multilayer Selective Absorber Coatings", by J. A. Thorton et al., *Electronics & Optics* 1982.
"Ion-Beam-Assisted Deposition of Optical Films", by R. P. Netterfield.

Primary Examiner—Vincent P. McGraw
Assistant Examiner—S. A. Turner
Attorney, Agent, or Firm—Robert A. Pajak

[57] ABSTRACT

Disclosed is a ring laser angular rate sensor constructed from a solid block with mirror assemblies joined to the block with a thermally formed gas tight seal. The mirror assemblies include a coating of alternating layers of zirconium dioxide ($ZrO_2$) and silicon dioxide ($SiO_2$) which have been ion beam sputtered on mirror substrates composed of a material which suitably matches the thermal coefficient of the laser block.

2 Claims, 1 Drawing Sheet

ION BEAM SPUTTERED MIRRORS FOR RING LASER GYROS

BACKGROUND OF THE INVENTION

The Government has rights in this invention pursuant to Contract No. F08635-84-C-0202 awarded by the Department of the Air Force.

The present invention relates to a novel construction for a ring laser angular rate sensor and more particularly to a construction employing novel low scattering mirrors in such sensors.

Ring laser angular rate sensors are well known and are particularly described in U.S. Pat. No. 3,373,650, issued to Killpatrick, and U.S. Pat. No. 3,390,606, issued to Podgorski, both of which are assigned to the assignee of the present invention. The above-referred to patents are incorporated herein by reference thereto. Ring laser angular rate sensors of the type referred to utilize a block of material that is substantially stable, both thermally and mechanically. The block usually includes a plurality of interconnected gas containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, must be sealed to the block to form a gas tight seal. The block is usually filled with a lasing gas such as a mixture of helium and neon. A sufficiently large electrical potential is applied between the anode and cathode to cause a discharge current therebetween which results in the production of a pair of counter-propagating laser beams within the block.

Associated with ring laser angular rate sensors is a source of error usually referred to as "lock-in." The source of error is predominantly caused by back scattering of light at each of the mirrors which form in part the optical closed-loop path which the counter-propagating laser beams traverse. As is well understood by those skilled in the art, there are two widely used techniques applied together to minimize the lock-in error. The first technique consists of dithering the block a taught in U.S. Pat. No. 3,373,650. Mechanically dithering the laser block reduces the source of error caused by lock-in to acceptable levels such that ring laser angular rate sensors became commercially successful. The second technique consists of producing mirror assemblies structured so as to provide highly polished substrates having superior reflective coatings which achieve minimal laser beam scattering at the surfaces thereof. Development of the mirror assemblies over the years has made it possible for the development of high performance ring laser angular rate sensors.

Prior art mirror assemblies comprise a block of material suitably polished for a mirror substrate. The mirror substrate usually is the same material as the laser block material so that they have matched thermal coefficients of expansion. The mirror assembly further comprises alternating layers of titanium dioxide ($TiO_2$) and silicon dioxide ($SiO_2$) deposited on the mirror substrate by a variety of deposition techniques including, among others, e-beam deposition and ion-beam sputtering.

The mirror assemblies of the prior art are fixed to the laser block by what is referred to as an optical contact. This requires that the block and the mirror substrate be highly polished so as to form an optical contact when the mirror substrate is pressed against the block. The joining of the laser block and the mirror block is accomplished at room temperatures.

These prior art ring laser angular rate sensors have proven highly satisfactory in operation and are rapidly gaining wide-spread acceptance for certain applications. These prior art ring laser angular rate sensors, however, are costly to manufacture due, primarily, to the high cost of polishing the laser blocks and mirror substrates.

SUMMARY OF THE INVENTION

An object of this invention is a provision of a novel construction for a ring laser angular rate sensor which permits it to be inexpensively manufactured.

Briefly, this invention contemplates the provision of a ring laser angular rate sensor constructed from a solid block with mirror assemblies joined to the block with a thermally formed gas tight seal. The mirror includes a coating of alternating layers of zirconium dioxide and silicon dioxide which have been ion-beam sputtered on mirror substrates composed of a material which suitably matches the thermal coefficient of the laser block.

DETAILED DESCRIPTION OF THE INVENTION

Figure 1:
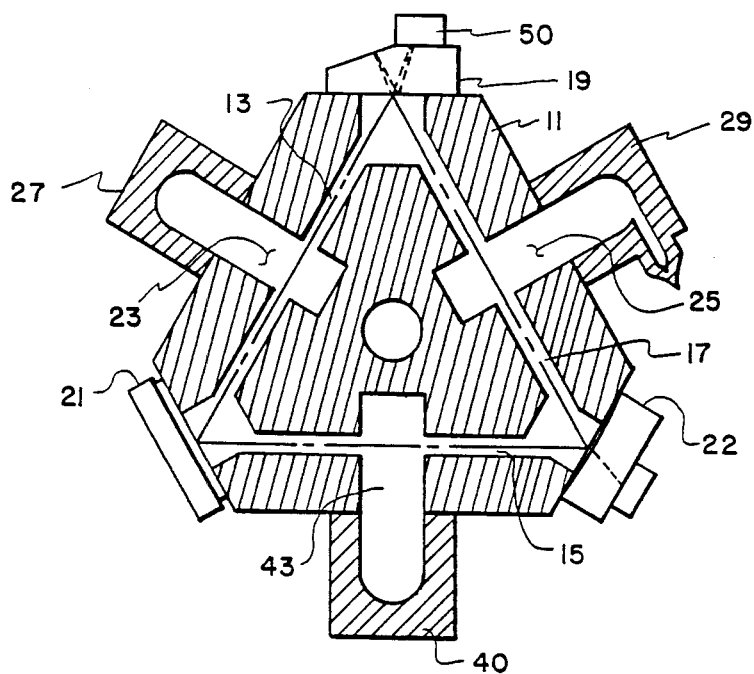
FIG. 1 is a planned view of a ring laser angular rate sensor constructed in accordance with the teaching of this invention.

Referring now to FIG. 1, there is disclosed a pictorial representation of a gas filled ring laser angular rate sensor 10 comprising a block 11 made of a borosilicate, preferrably BK-7 glass (letter number combinations are Schott Optical Commercial Designations). A plurality of three interconnected tunnels 13, 15, and 17 are bored within block 11 at angles to each other to form a triangular-shaped cavity. Mirror assemblies 19, 21, and 22 are mounted on block 11 at the intersection of each of the tunnels 13, 15, and 17, respectively, in a manner as will subsequently be described. Each mirror functions to reflect light from one tunnel into the next thereby forming a closed-loop optical path.

A pair of anodes 27 and 29 are mounted on block 11 and adapted to communicate with laser tunnels 13 and 17, respectively, through interconnecting cavities 23 and 25, respectively. A quantity of lasing gas for plasma is adapted to be contained within the tunnels 13, 15, and 17, and other tunnels in communication therewith. The gas may be inserted into the block cavities through one of the anode cavities used as a fill tunnel and one of the anodes which may also serve as a sealable port, e.g. anode 29.

A cathode 40 is mounted on block 11 and in communication with the optical closed-loop cavity through interconnecting cavity 43. Cathode 40 is symmetrically located relative to anodes 27 and 29, and tunnels 13, 15, and 17. These symetrical location of the pair of anodes and cathode is intended to reduce gas flow effects which can adversely affect the performance of the rate sensor, as is well known.

In operation, with a sufficiently large potential applied between the cathode and the anodes, a first discharge current is emitted from cathode 40 out into tunnel 15 toward mirror 19 and through tunnel 13 to anode 27. A second discharge current flows through cathode 40 out into tunnel 15 toward mirror 21 and through tunnel 17 to anode 29. These two discharge currents are usually controlled in intensity. The discharge current's function is to ionize the lasing gas and thereby provide a pair of counter-propagating laser beams within the closed-loop optical cavity in a well known manner. It will be appreciated that ring laser angular rate sensors with a rectangular lasing path or other optical cavity configurations, including a cubic cavity, can be constructed in accordance with the teaching of this invention.

Each of the aforementioned mirrors perform functions in addition to redirecting the laser beams about the cavity. Mirror 19 may be constructed as to be partially transmissive for providing a readout beam signal to be directed toward a photosensitive means 50. Mirror 22 is preferrably curved so as to aid in the alignment and focusing or the counter-propagating laser beams within the cavity. Lastly, mirror 21 may be in part a transducer for cavity path length control in a well known manner. A suitable readout device 50 is disclosed in a co-pending patent application entitled, "Readout for Ring Laser Angular Rate Sensors", by Killpatrick, having Ser. No. 733,297.

Figure 2:
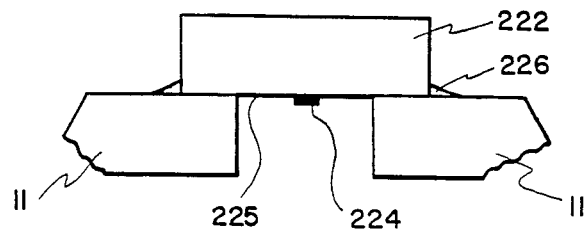
FIG. 2 is a partial sectional view showing detail of a mirror sealed to the laser block.

The construction of the ring laser angular rate sensor described above and its performance are in accordance with the basic operating principles of prior art ring laser angular rate sensors. Referring now to FIG. 2, an important contributor to reducing the construction costs in accordance with the teaching of this invention is the use of a frit seal to join each of the mirror assemblies 19, 21, and 22 to the block 10 containing the interconnecting tunnels. The frit seal is chosen in place of optical contacts generally used in the prior art ring laser angular rate sensors since the use of frit seals, generically referred to as a thermal seal, eliminates the need for creating a highly polished surface on block 11 joining the mirror assemblies to a block by optical contact. In the preferred embodiment of the invention, the ring laser angular rate sensor block 11 is a solid block of BK-7 glass to which the interconnecting tunnels are machined therethrough. A substrate 222 for each mirror assembly is also formed from BK-7 glass. An optical coating 224 of alternating layers of zirconium dioxide and silicon dioxide is deposited on surface 225 of substrate 222 by the ion-beam deposition process. A suitable ion-beam process is that substantially shown and described in U.S. Pat. No. 4,142,958, entitled, "Methods for Fabricating Multi-Layer Optical Films" issued to Wei et al, and is hereby incorporated by reference herein by reference thereto.

In FIG. 2, the optical coating is shown as only a spot having sufficient area to reflect impinging laser beams thereon. The choice of material for laser block 11 and mirror substrate 222 is dictated by the need to have compatible coefficients of expansion for the laser block 11 and mirror substrate 222. With compatible coefficients of expansion, a thermally formed frit seal process can be used to join the mirror substrate 222 to block 11. As will be appreciated by those skilled in the art, the frit seal is formed with a solderable glass or frit material 226 in a process in which temperatures are raised to be in the range of 450° to 500° C. for a substantial period of time. This elevated temperature imposes dramatically the need for each of the parts to have a compatible temperature coefficient of expansion.

The ion-beam sputtered deposition of the alternating layers of the zirconium dioxide/silicon dioxide optical coating provides such a coating which can tolerate the high temperatures required in implementing the frit seal joining of the mirror substrate to the laser block. To frit seal a mirror substrate to a laser block in accordance with FIG. 2, it is necessary to achieve temperatures generally in excess of 450° C.

The optical coating of alternating layers of zirconium dioxide and silicon dioxide on the mirror substrates deposited by ion-beam sputtering, in accordance with the invention with reference to FIG. 2, exhibit the necessary high optical quality, high plasma stability, and high temperature stability in excess of the 450° C. temperature to permit fabrication of the sensor via sealing the mirror substrate to the laser block. Prior art techniques and materials do not have the characteristics demanded in ring laser angular rate sensor applications when materials ar subjected to the high temperature thermal sealing process. Specifically, prior art e-beam deposition techniques of titanium dioxide do not degrade with the frit seal annealing temperatures, but are unstable in the plasma of the ring laser and degrade rapidly such that the ring laser fails. Optical coatings of ion beam sputtered titanium dioxide/silicon dioxide on a mirror substrate have an increase in crystallinity when such substrates are thermally sealed to a block. The increase of crystallinity causes the mirrors to degrade such that the optical scatter increases resulting in poor performance of the sensor.

These ion beam titanium dioxide/silicon dioxide mirrors are amorphous and exhibit no crystallinity in the as-deposited state. At temperatures in excess of 250° C., however, the titanium dioxide based mirrors crystallize into a predominantly anatase structural phase of titanium dioxide with sufficient large grains to degrade optical scatter.

In contrast to ion beam deposited $TiO_2/SiO_2$ mirrors, $ZrO_2/SiO_2$ mirrors have a crystallinity in the as-deposited state which varies in grain size with deposition temperature but which does not change with subsequent annealing up to 600° C. temperatures. $ZrO_2/SiO_2$ mirror coatings have been ion-beam deposited at ambient ion beam process temperatures (in the range of 150° C.) exhibiting a grain size sufficiently small as to not affect optical scatter at 633 nm. More importantly, as the mirrors are subsequently annealed in preparation for the fritting process, the grain size does not increase. Hence the low scatter properties of ion beam sputtered $ZrO_2/SiO_2$ mirrors are preserved up to the temperatures necessary for fritting of the mirrors onto the gyro block. Additionally, the stability of these ion beam $ZrO_2/SiO_2$ deposited mirror coatings also makes them free from optical degradation in the gyro plasma.

The use of mirror assemblies having an optical coating of alternating layers of zirconium dioxide/silicon dioxide deposited by the ion-beam sputtering process do not degrade with annealing temperature and have excellent laser mirror properties. Therefore, the mirrors constructed with the aforesaid optical coating may be thermally sealed to the laser block to provide a low cost ring laser angular rate sensor.

The embodiments of the invention in which an exclusive property or right is claimed are defined as follows:

1. A ring laser angular rate sensor in which counter-rotating laser beams propagate, comprising in combination:
   a block comprised of borosilicate glass;
   a plurality of interconnecting tunnels within said block;
   a plurality of mirrors, each comprised of a borosilicate glass substrate and ion-beam sputtered alternating layers of zirconium dioxide and silicon dioxide thereon, each of said mirrors being fixed to said block with a frit seal to bond said substrate to said block, and each of said mirrors located at an intersection of a pair of said interconnecting tunnels to form a closed-loop resonant cavity within said block.

2. The sensor of claim 1 wherein said borosilicate glass is BK-7.